(12) United States Patent
Terao et al.

(10) Patent No.: US 7,137,007 B2
(45) Date of Patent: Nov. 14, 2006

(54) DEVICE AND METHOD FOR AUTHENTICATING USER'S ACCESS RIGHTS TO RESOURCES

(75) Inventors: Taro Terao, Nakai-machi (JP); Rumiko Kakehi, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 980 days.

(21) Appl. No.: 09/794,074

(22) Filed: Feb. 28, 2001

(65) Prior Publication Data

US 2001/0009026 A1 Jul. 19, 2001

(30) Foreign Application Priority Data

Aug. 5, 1997 (JP) .................................. 9-210399

(51) Int. Cl.
*H04L 9/00* (2006.01)
(52) U.S. Cl. ......................... 713/180; 713/176; 726/27
(58) Field of Classification Search ........ 713/168–181, 713/192, 185; 380/54, 251; 726/10, 27–30; 705/65, 67, 69, 76
See application file for complete search history.

(56) References Cited

U.S. PATENT DOCUMENTS 5,347,581 A * 9/1994 Naccache et al. ............. 380/30
5,825,880 A * 10/1998 Sudia et al. ................. 713/180
6,175,921 B1 * 1/2001 Rosen ......................... 713/173

OTHER PUBLICATIONS

Chang et al., An Id-Based Signature Scheme Based Upon Rabin's Public Key Cryptosystem, 1991, IEEE, pp. 139-141.*
Schneier, Applied Crytography, 1996, Wiley, 2nd Edition, pp. 115, 483, and 71.*

* cited by examiner

*Primary Examiner*—Kim Vu
*Assistant Examiner*—Paula Klimach
(74) *Attorney, Agent, or Firm*—Oliff & Berridge PLC

(57) ABSTRACT

A burden caused by handling a large number of unique identifying information pieces such as authentication keys is to be lightened from both the user side and the protector side such as application creators. A proof data verification device sends authentication data to a proof data generation device. Signature data generation means and presignature data generation means in the proof data generation device cooperate with each other to generate proof data (a signature based on a discrete logarithm problem) from the received authentication data as well as held user unique identifying information and an access ticket, and send the proof data back to the proof data verification device. Verification means in the proof data verification device verify the signature, and if the verification is successful, the execution of program is allowed.

20 Claims, 5 Drawing Sheets

Fig. 4

| Verification side | User | Token |
|---|---|---|
| $m \in_R Z_n$ → | | $k \in_R Z_n$ |
| | ← | $r' := g^k \in G$ |
| | ← $r := H(m, r') \in Z_n$ → | |
| | | ← $s' := k - rf(e,y) \in Z_n$ |
| | ← $s := s' - rt \in Z_n$ | |
| $r \stackrel{?}{=} H(m, g^s y^r) \in Z_n$ | | |

Normal Operation

Fig. 5

| Verification side | User | Token |
|---|---|---|
| $m \in_R Z_n$ → | | $k \in_R Z_n$ |
| | ← | $r' := g^k \in G$ |
| | ← $r := h(r' \mid m) \in Z_n$ → | |
| | | ← $s' := k - rf(e,y) \in Z_n$ |
| | ← $s := s' - rt \in Z_n$ | |
| $r \stackrel{?}{=} h(g^s y^r \mid m) \in Z_n$ | | |

Operation for Schnorr signature

Fig.6

| Verification side | User | | Token |
|---|---|---|---|
| $m \in_R Z_n$ → | | | $k \in_R Z_n$ |
| | | ← | $r' := g^k \in G$ |
| | $r := m + \{r'\} \in Z_n$ ← | → | |
| | | ← | $s' := k \cdot r f(e, y) \in Z_n$ |
| | $s := s' - rt \in Z_n$ ← | | |
| $r \stackrel{?}{=} m + \{g^s y^r\} \in Z_n$ | | | |

Operation for Nyberg-Rueppel signature

DEVICE AND METHOD FOR AUTHENTICATING USER'S ACCESS RIGHTS TO RESOURCES

BACKGROUND OF THE INVENTION

1. Field of the Invention

The present invention relates to an authentication technique for authenticating user's access rights to resources.

2. Description of the Prior Art

As the prior art belonging to the same field as the present invention there is known a program execution control technique, which comprises:
(1) embedding a user authentication routine in an application program;
(2) the routine checking whether the user who is trying to execute the application possesses a regular key for authentication; and
(3) continuing the execution of the program only when the presence of the key for authentication has been confirmed, or stopping the execution of the program if the answer is negative.

By utilizing this control technique, only a regular user possessing an authentication key is allowed to execute the application program. This technique is in practical use in the software distribution business. Examples of products produced according to this technique are Sentinel Super Pro (trademark) of Rainbow Technologies, Inc. and HASP (trademark) of Aladdin Knowledge Systems Ltd.

The following is a more detailed explanation of the program execution control technique.
(1) The user who executes a software program possesses an authentication key as user identifying information. The authentication key is a key for encryption, which is distributed to users by a person who permits the utilization of software, for example a software vender. The authentication key, for the prevention of duplication, is sealed firmly into memory or the like in hardware and is delivered to the associated user by physical means such as mail or the like.
(2) The user loads the hardware with the authentication key incorporated therein into a his or her work station/personal computer by a specified method. For example, the hardware is loaded into a printer port.
(3) When the user starts the application program and the execution of the program reaches the user authentication routine, the program communicates with the hardware which incorporates the user authentication key therein. On the basis of the communication the program checks whether the authentication key is correct or not, and if the key is correct, execution shifts to the next step. On the other hand, if the communication fails and the presence of the authentication key cannot be confirmed, the program itself stops to inhibit subsequent execution.

Identification of the authentication key in the authentication routine is performed in accordance with the following protocol.
(1) The authentication routine generates an appropriate number and transmits it to the key-containing hardware.
(2) The key-containing hardware, using the authentication key contained therein, encrypts the transmitted number and sends it back to the authentication routine.
(3) The authentication routine judges whether the replied number is an anticipated number or not, that is, whether it is a number obtained by encrypting the transmitted number to the hardware with the correct authentication key.
(4) In the case where the replied number coincides with the anticipated number, the execution of the program is continued, while otherwise, the execution of the program is stopped.

In this case, the communication between the application program and the authentication key-containing hardware must differ at every execution even if exchange is made with the same hardware at the same location in the same application. Otherwise, if the contents of communication in a normal execution process are once recorded and if subsequently a reply is made to the application program in accordance with the recorded contents at every execution of program, it becomes possible for even a user not possessing a correct authentication key to execute the program. Such an improper execution of the application program by the reproduction of communication contents is called a replay attack.

To prevent such a replay attack, a random number which is newly generated at every communication is used as the number sent to the key-containing hardware.

The prior art described above involves the problem that at the time of making an application program it is required for the programmer to assume an authentication key of a user in advance and then perform a program protection processing on the basis of the authentication key.

That is, the programmer is required to anticipate a correct reply from the key-containing hardware at the time of programming and then create a program so that the program is executed correctly only upon receipt of a correct reply.

The prior art described above is utilized basically in two ways, both of which, however, involve the following problems.
(1) According to the first method, different authentication keys are provided for different users. More particularly, a different authentication key is provided for each user such as authentication key A for user A and authentication key B for user B.

In this case, it is necessary for the programmer to make a program while changing the authentication routine in the program appropriately for each user. In more particular terms, since the authentication key differs for each user, it is required that the authentication routine in the program be prepared so as to identify the authentication key peculiar to the each user who utilizes the program. In other words, the programmer is required to make as many different programs as the number of users who utilize the program.

In the case where a large number of users are involved, the work for individualizing programs for each user requires intolerable labor for the programmer, and the list of user authentication keys to be managed becomes vast.
(2) According to the second method, the programmer prepares a different authentication key for each application, for example, like authentication key A for application A and authentication key B for application B. And each application program is prepared so as to identify a unique authentication key.

According to this second method, unlike the first method, it is no longer necessary to make a program individually for each user, but the user is required to possess authentication keys by the number of applications to be utilized.

Such a limitation gives rise to the following problems for both programmer and users.

As noted previously, it is necessary that authentication keys be delivered in a firmly sealed state to users. Thus, in contrast with the program itself which can be distributed easily through a network, the distribution of hardware which contains an authentication key must rely on physical means such as mail or the like. This limitation is a heavy burden on the programmer in all of cost, time and packing work.

To meet the user needs, the programmer is required to stock hardware in a certain number different for each application, thus requiring cost for stock management.

In addition, each user submits to the troublesomeness of replacing hardware at every change of application to be used.

The also arises the inconvenience that even if a user wants to use a certain application, the user must wait for the arrival of hardware with an authentication key sealed therein and cannot use it at once.

To lighten this burden there is adopted a method wherein a plurality of authentication keys are sealed beforehand in hardware, and each time the user is permitted to use a new application, a password for making an unused authentication key in hardware utilizable is given to the user. However, it is apparent that the foregoing problems are basically not solved even by this method. Actually, in commercialization, a design is made so as to permit adjacent connection of plural hardware units.

Thus, even if either of the above two methods is adopted, there still remain problems in point of convenience on both programmer and user sides.

Considering external characteristics of the execution control, the prior art may also be applicable to the protection of mail privacy, access control for file and computer resources, and other ordinary access control for digital contents. However, due to the foregoing problems, it is impossible to apply the prior art to those fields.

SUMMARY OF THE INVENTION

The present invention has been accomplished in view of the above-mentioned circumstances and it is an object of the invention to provide a user's access rights authentication technique capable of solving inconveniences derived from handling of many unique identifying information pieces such as authentication keys which occur on both the user side and the protector side such as an application creator and further capable of easily authenticating a user's access rights in performing program execution control, the protection of access qualification of digital contents (e.g. static and dynamic images and voice), mail privacy protection, and access control for file and computer resources.

According to the present invention, in order to achieve the above-mentioned object, there is provided a user's access rights authentication device for authenticating a user's access rights by verifying the legitimacy of a signature generated for proving the authority of the user, the user's access rights authentication device comprising a first memory means for storing user unique identifying information, a second memory means for storing an access ticket calculated from both the user unique identifying information and a signature key, a first generation means for generating a presignature by use of the user unique identifying information stored in the first memory means, a second generation means for generating a signature by use of the user access ticket stored in the second memory means, and a verification means for verifying the legitimacy of the signature generated by the second generation means, the first and the second generation means cooperating with each other to generate the signature.

In the above construction, by introducing the customized signature key (access ticket) it is possible to make unique security characteristic information and user unique identifying information independent of each other, so that it suffices for each of the protector side and the user side to prepare only one piece of unique identifying information.

The access ticket is data calculated on the basis of both specific user unique identifying information and unique security characteristic information. Without the knowledge of user unique identifying information, it is difficult to calculate a unique security characteristic information from the access ticket. Only when a correct combination of user unique identifying information and access ticket, namely a combination of user unique identifying information and access ticket calculated on the basis of the user unique identifying information, is inputted, correct proof data is calculated. Therefore, the user holds unique identifying information in advance and the protector side such as a programmer provides unique security characteristic information independently of the unique identifying information which the user possesses, then access ticket is prepared and distributed in accordance with the user unique identifying information and the unique security characteristic information which has been used, for example, in the creation of an application program. By so doing, it is possible to authenticate the user's access rights such as execution control.

The present invention can be realized also as a method. Further, at least part of the present invention can be realized as a program product.

BRIEF DESCRIPTION OF THE DRAWINGS

FIG. 4 is a diagram explaining the operation of the embodiment;

FIG. 5 is a diagram explaining the operation of the embodiment; and

FIG. 6 is a diagram explaining the operation of the embodiment.

DETAILED DESCRIPTION OF A PREFERRED EMBODIMENT

[Entire Configuration]

The present invention will be described in detail hereunder. Before making reference to a concrete embodiment of the present invention, description will first be directed to an entire configuration in a mode for carrying out the invention.

Figure 1:
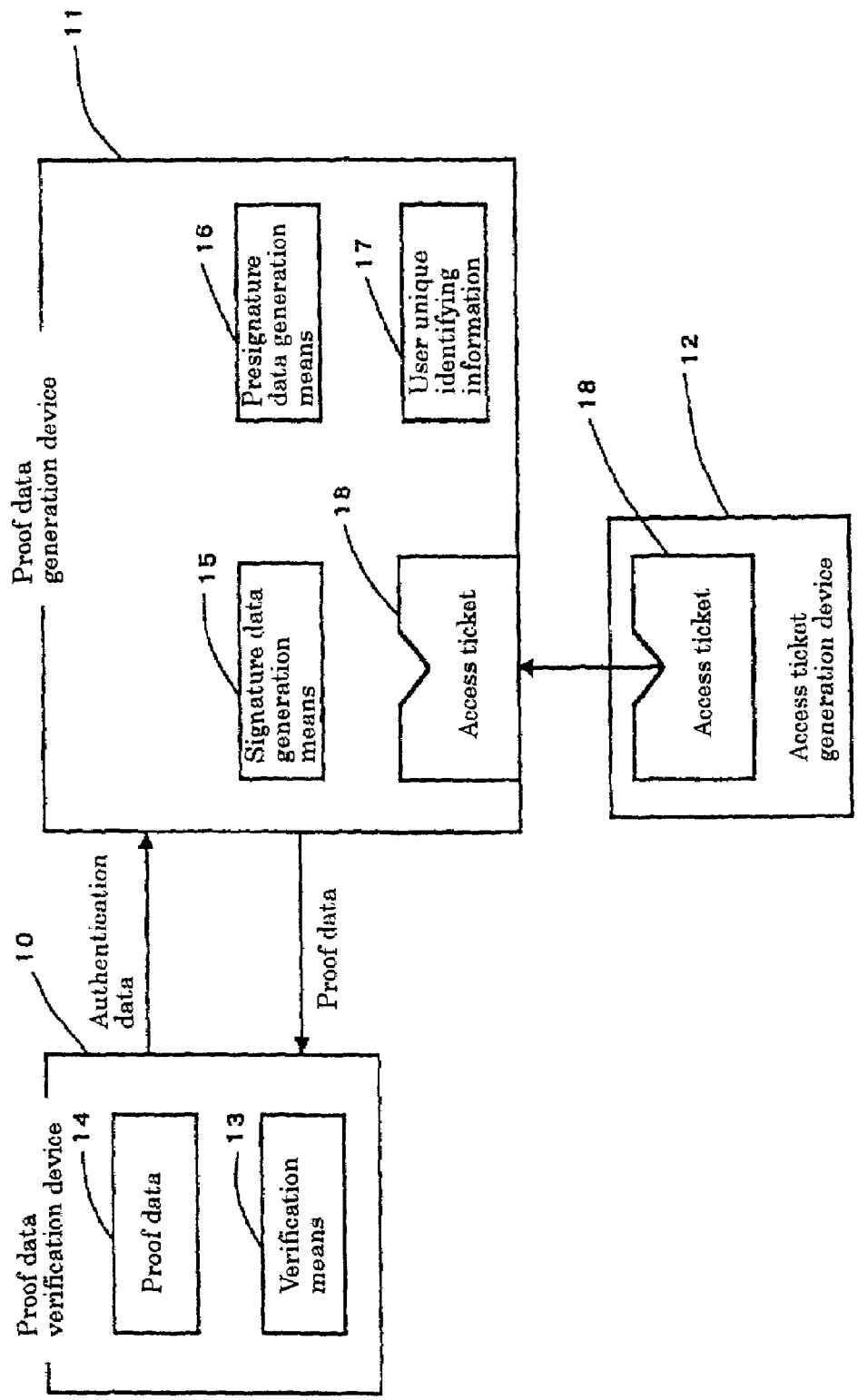
FIG. 1 is a diagram showing an entire configuration of an embodiment of the present invention.

Reference will first be made to the case where the present invention is applied to execution control for an application program running on user's PC or work station. FIG. 1 shows the configuration of an associated device embodying the invention.

In FIG. 1, a program execution control device (user authentication device) includes a proof data verification device 10, a proof data generation device 11, and an access ticket generation device 12. The proof data verification device 10 is provided with a verification means 13 and holds authentication data 14. The proof data generation device 11 is provided with a signature data generation means 15 and a presignature data generation means 16 and holds a user unique identifying information 17 and a customized signature key (access ticket) 18. The access ticket generation device 12 generates the access ticket 18 and provides it to the proof data generation device 11. As to the access ticket 18, a detailed description thereof will be given later.

The proof data verification device 10 sends the authentication data 14 to the proof data generation device 11. The signature data generation means 15 and the presignature data generation means 16 in the proof data generation device 11 generate proof data (signature) from the received authentication data 14 and both the user unique identifying information (unique information for identifying the user) 17 and the access ticket 18 held in the proof data generation device 11, and sends the proof data thus generated back to the proof data verification device 10. The verification means 13 in the proof data verification device 10 verifies the signature, and if the verification is successful, the execution of program is permitted.

In this mode, the proof data generation device 11 can be realized as a proof program on the user's computer. In this case, if the user can copy the user unique identifying information 17 and distribute the copies, it follows that even users not possessing a legitimate utilization right are allowed to use the application program. Therefore, it is preferable that the user unique identifying information 17 be loaded in the computer so as not to permit stealing thereof even by the user who is the legitimate holder thereof and that a proof hardware (e.g. IC card or board) having an anti-tamper characteristic be used. The use of such a portable hardware as IC card is convenient in the case where the user works on plural PCs or work stations.

The proof data verification device 10 is constituted as part of the application program utilized by the user. More specifically, when the user starts the application program on a PC or a work station, the proof data verification device 10 described as program in the application program is started and there is made communication with the proof data generation device 11 to effect user authentication. Only when the communication is terminated correctly, the execution of the application program is made possible.

In order for the user to utilize the application program embedded in the proof data verification device 10, it is necessary for the user to acquire a customized signature key (access ticket) issued for the user and corresponding to the application program. The user then registers the thus-acquired access ticket in a proof data generation program installed on the PC or work station. For example, where the user unique identifying information is sealed in an IC card, the user loads the IC card on the PC or work station. It is optional whether the access ticket is to be placed on the PC or work station or is to be placed in the IC card.

The proof data generation device 11 (constituted by both a program on a PC or a work station and an IC card) performs calculation on the basis of both user unique identifying information 17 and access ticket 18 and communicates with the proof data verification device 10 on the basis of the calculation. The user unique identifying information 17 is used in the course of this calculation, but if the information 17 leaks to the exterior, there arises a problem, so it is necessary that at least a part of the above program be protected by a defensive means such as an IC card or the like.

It is only when the user unique identifying information 17, the access ticket 18 and the unique security characteristic information verified by the proof data verification device 10 are correctly correlated with one another that the authentication by the proof data verification device 10 becomes successful as a result of the communication.

If either the user unique identifying characteristic 17 or the access ticket 18 is absent, the authentication will not be successful.

The access ticket is issued for a specific user. That is, the user unique identifying information 17 of a specific user is used at the time of generation of the access ticket. When the user unique identifying information 17 used in generating the access ticket 18 and the user unique identifying information 17 used by the proof data generation device 11 are not coincident with each other, the authentication will not be successful, either.

The access ticket 18 is generated on the basis of specific unique security characteristic information, and the proof data verification device 10 is constituted so as to authenticate the unique security characteristic information. Therefore, also when the characteristic information underlying the generation of the access ticket and the characteristic information to be authenticated by the proof data verification device 10 embedded in the application program are not correlated with each other, the authentication will not be successful.

There may also be adopted a method wherein the application program is executed on another computer connected through a network and the results of the execution are communicated to the user's computer through the network. This configuration is based on what is called a server-client model. In the previous execution control for the application program which is executed on the user's PC or work station, the communication between the proof data generation device 11 and the proof data verification device 10 is carried out as what is called inter-process communication. But in the configuration based on the server-client model, the communication between the proof data generation device 11 and the proof data verification device 10 is carried out as communication which follows a network protocol such as TCP/IP (transmission control protocol/internet protocol).

Also when the application program is constructed on a dedicated device, the present invention is applicable. For example, the whole of the proof data generation device 11 is mounted in an IC card and the access ticket 18 acquired is also registered in the IC card. The proof data verification device 10 is mounted on the above dedicated device, but since the dedicated device has a slot for insertion of the IC card, the user inserts his or her IC card into the slot to effect authentication.

The configuration using such a dedicated machine can be applied to ATMs in a bank or game machines in game arcades.

As methods for the user to acquire the access ticket 18 there are a method wherein a common center for the issuance of access ticket 18 generates and distributes the access ticket in response to the user's request for issuance and a method wherein an application programmer generates the access ticket each independently with the aid of an access ticket issuing program or the access ticket generation device 12.

In such a case, the access ticket generation device 12 is managed by a ticket issuer, and by such a legitimate right holder the access ticket 18 is prepared and distributed independently of the user's environment.

The access ticket 18 thus generated may be delivered to the associated user through a portable storage medium such as floppy disk, or may be delivered through a network using an electronic mail or the like because the access ticket 18 is safe enough.

That the access ticket 18 is very safe is based on the following two properties.

1) The access ticket is a signing type ticket. More specifically, only the user to whom an access ticket has been issued (to be exact, the person who possesses the user unique identifying information which was used in the generation of the access ticket) can properly operate the proof data generation device by use of the access ticket. Therefore, even if an ill-willed third party acquires the access ticket of another user illegally, it is impossible for the third party to utilize the access ticket unless he or she acquires the user unique identifying information of the regular user to whom the access ticket has been issued.

2) The access ticket possesses more strict safety. More specifically, even if an ill-willed third party collects a certain number of access tickets and makes any analysis, it is impossible to forge another access ticket on the basis of the information obtained or constitute such a device as imitates the operation of the proof data generation device to effect authentication.

A more concrete configuration of the present invention will be described below by way of an embodiment thereof. In this embodiment, the access ticket is applied to a signature method based on a general discrete logarithm problem to be described hereunder.

The signature method adopted in this embodiment of the present invention uses a finite group G (described multiplicatively) for which a discrete logarithm problem is difficult in point of computational complexity and also uses an element g of order n.

A signature key x is an element of a residue class ring Z/nZ based on a modulus n in a ring of rational integers, and a verification key y is an element of a finite group G which satisfies $y=g^x$.

The signature for element m of the residue class ring Z/nZ comprises two elements r and s of Z/nZ. Verification of signature is given as follows:

[Expression 2]

$$r = H(g_r y^s, m) \quad (1\text{-}1)$$

where the function H is an arbitrary function of two variables which determines the element H (a, b) of the residue class ring Z/nZ from both element a in the finite group G and element b in the residue class ring. Signatures r and s are as follows:

[Expression 3]

$$r = g^k$$
$$s = k - r'x$$

where r'=H(m,r), and k∈Z/nZ is a random number.

Figure 2:
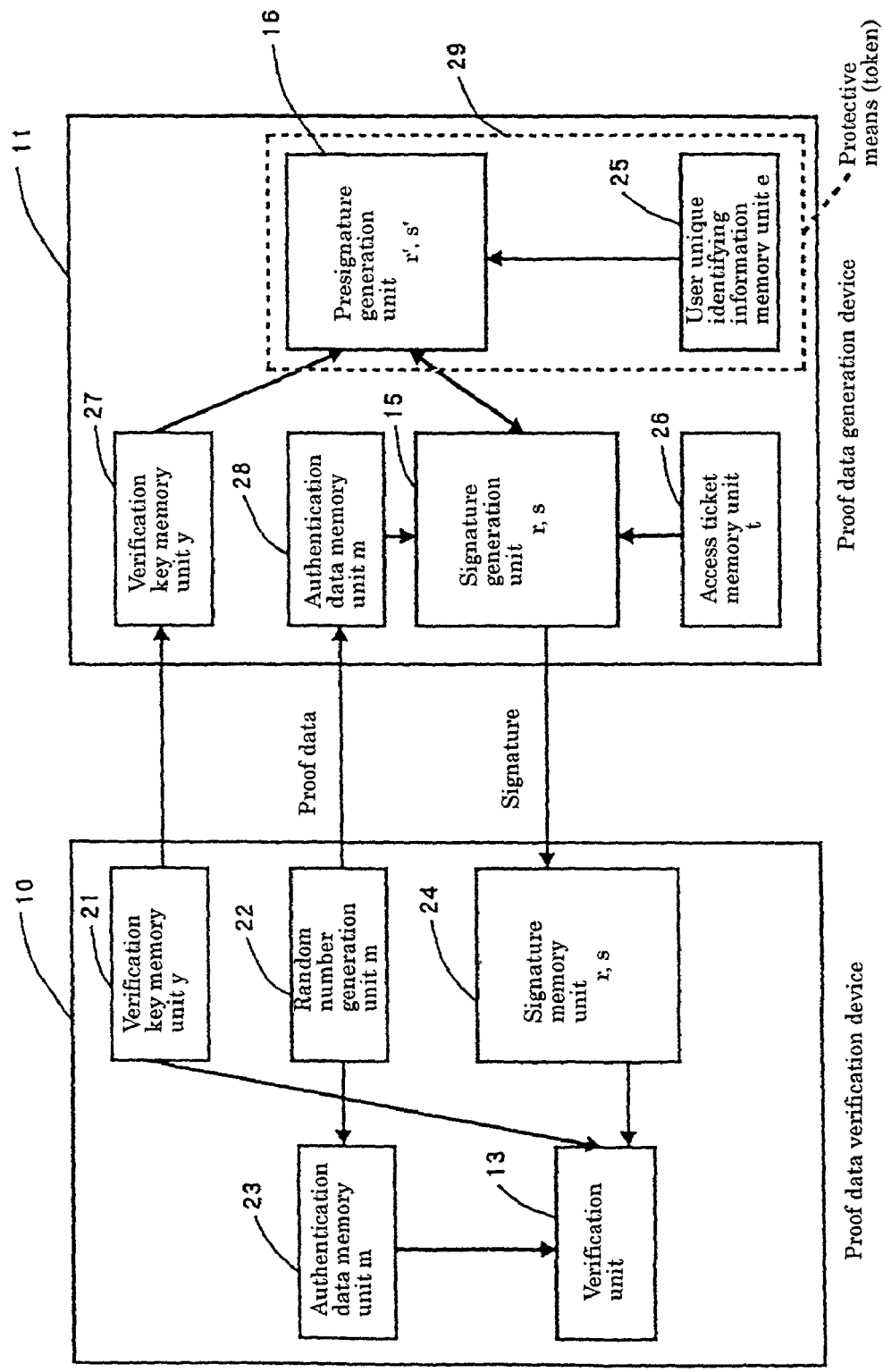
FIG. 2 is a block diagram showing the configuration of a proof data verification device and the one of a proof data generation device both used in the embodiment.
Figure 3:
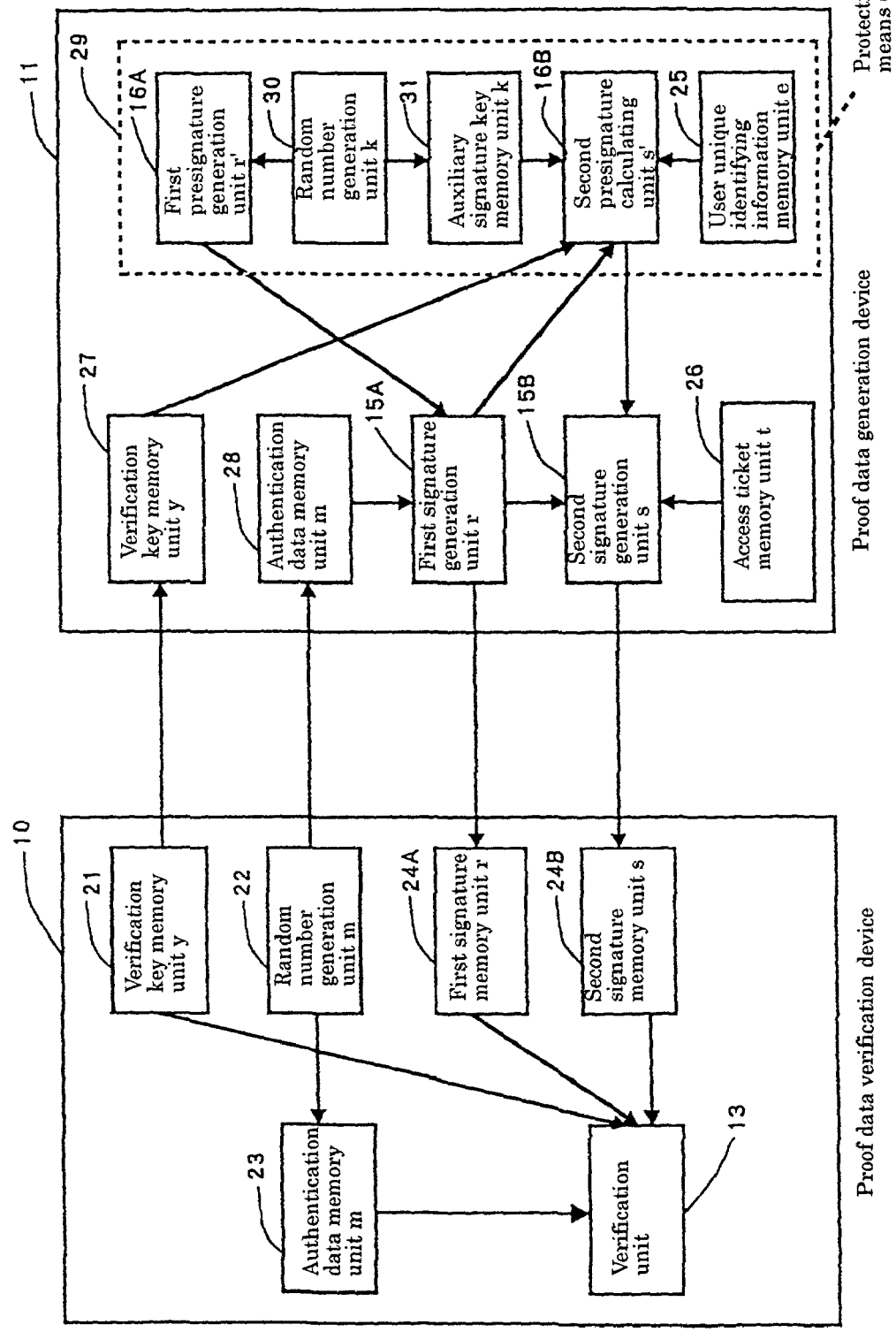
FIG. 3 is a block diagram showing a detailed configuration of the proof data verification device and the one of the proof data generation device.

FIG. 2 shows configuration examples of a proof data verification device 10 and a proof data generation device 11, FIG. 3 shows a detailed configuration mainly of a signature generation unit in the proof data generation device 11, and FIG. 4 shows the operation of this embodiment. In FIGS. 2 and 3, the portions corresponding to those in FIG. 1 are identified by corresponding reference numerals.

In FIG. 2, the proof data verification device 10 includes a verification unit 13, a verification key memory unit 21, a random number generation unit 22, an authentication data memory unit 23, and a signature memory unit 24. The proof data generation device 11 includes a signature data generation unit 15, a presignature data generation unit 16, a user unique identifying information memory unit 25, an access ticket memory unit 26, a verification key memory unit 27, and an authentication data memory unit 28.

First, a user unique identifying information e different for each user is determined. The information e is stored in the user unique identifying information memory unit 25. The presignature generation unit 16 and the user unique identifying information memory unit 25 are accommodated in a protective means (also called token) 29.

FIG. 3 shows detailed configurations mainly of the presignature generation unit 16 and the signature generation unit 15 in the proof data generation device 11 illustrated in FIG. 2. The presignature generation unit 16 in FIG. 2 comprises a random number generation unit 30, an auxiliary signature key memory unit 31, a first presignature generation unit 16A, and a second presignature generation unit 16B. The signature generation unit 15 in the proof data generation unit 11 in FIG. 2 comprises a first signature generation unit 15A and a second signature generation unit 15B. Further, the proof memory unit 24 in the proof data verification device 10 in FIG. 2 comprises a first signature memory unit 24A and a second signature memory unit 24B.

Access ticket t is generated in accordance with the following expression (1-2):

[Expression 4]

$$t = x - f(e,y) \bmod N \quad (1\text{-}2)$$

where N is an arbitrary multiple of n. Of course, with N=0, the expression (1-2) is carried out on a ring of rational integers. Assuming that 0, 1, 2, . . . , n−1 are representative elements of the residue class ring Z/nZ and assuming if necessary that these are integers, calculation is executed.

Function f is a function unlikely to cause conflict of function values. For example, it can be determined like the following expression (1-3) using a one-way hash function h:

[Expression 5]

$$f(x,y) = h(x|y) \quad (1\text{-}3)$$

where x|y stands for a bit connection of x and y.

The one-way hash function is a function having the property that it is extremely difficult to calculate different x and y which satisfy the relationship of h(x)=h(y). As examples of the one-way hash function there are known MD2, MD4 and MD5 defined by RSA Data Security Inc., as well as SHS (Secure Hash Standard) defined by the U.S. Federal Government.

In the following description, the data m which the proof data verification device 10 generates for authentication will be referred to as authentication data, while the signatures r and s which a proving device generates for proof will be referred to as proof data.

The operation of this embodiment will be described below.

[Step 1]

The proof data verification device 10 is started when the user accesses a program (digital contents) which requires authentication by a program execution controller (user's access rights authentication device).

In the case where the proof data verification device 10 is constituted as part of an application program which runs on the user's PC or work station, the application program is started by a conventional method in which the user employs an indicating means such as the keyboard or the mouse. When the execution of the application program reaches the program which constitutes the proof data verification device 10, the operation of the device 10 is started.

Where the proof data verification device 10 is constituted on another PC or work station (called server) connected through a network, the user starts a communication program on his or her PC or work station. The proof data verification device 10 is started upon request for opening of communication to the server which request is made by the communication program in accordance with a predetermined procedure. For example, when the user communication program intends to follow a procedure called TCP/IP at the time of communication with the server, the proof data verification device is made corresponding to a specific port in advance and setting is made so that the user communication program designates the port and requests the server for TCP connection, whereby it becomes possible for a daemon (inetd) on the server to start the proof data verification device 10 in response to the TCP connection request. Such an implementing method is widely utilized in such a network as internet.

It is also possible to make the proof data verification device 10 into a device for a special purpose. For example, the proof data verification device 10 may be constituted as a program printed to a ROM in an IC card reader-writer; that is, it can be made a program loaded in a microcontroller of an IC card. In this case, when the user inserts the IC card into the reader-writer, the proof data verification device 10 is started.

[Step 2]

The proof data verification device 10 generates an authentication data m and stores it in the authentication data memory unit 23. The authentication data m is generated so as to take a different value at every generation. In this embodiment, the proof data verification device 10 has a random number generation unit 22, and a random number generated by the random number generation unit 22 is stored as authentication data m into the authentication data memory unit 23.

Further, the authentication data m and the verification key y stored in the verification key memory unit 21 are stored in the verification key memory unit 27 for the storage of authentication data and the authentication data memory unit 28 both disposed in the proof data generation device 11.

[Step 3]

The random number generation unit 30 in the proof data generation device 11 generates an appropriate random number k and stores it in the auxiliary signature key memory unit 31, while the first presignature generation unit 16A raises the base g in the finite group G to the k-th to generate a first presignature r', which satisfies the following expression (1-4):

[Expression 6]

$$r'=g^k \qquad (1-4)$$

[Step 4]

Using a function H of two variables, the first signature generation unit 15A in the proof data generation device 10 generates a first signature r from both the authentication data m stored in the authentication data memory unit 28 and the first presignature r' generated by the first presignature generation unit 16A, and stores it in the first signature memory unit 24A. The first signature r satisfies the following expression (1-5):

[Expression 7]

$$r=H(m,r') \qquad (1-5)$$

[Step 5]

The second presignature generation unit 16B in the proof data generation device 11 generates a second presignature s' from the auxiliary signature key k stored in the auxiliary signature key memory unit 31, the first signature r generated by the first signature generation unit 5A and further from the user unique identifying information e stored in the user unique identifying information memory unit 25, and in accordance with the following expression (1-6):

[Expression 8]

$$s'=k-rf(e,y) \qquad (1-6)$$

[Step 6]

The second signature generation unit 15B in the proof data generation device 11 generates a second signature s from the second presignature s' generated by the second presignature generation unit 16B, the first signature r generated by the first signature generation unit 15A and further from the access ticket t stored in the access ticket memory unit 26, and in accordance with the following expression (1-7), then stores it in the second signature memory unit 24B disposed in the proof data verification device 10:

[Expression 9]

$$s=s'-rt \qquad (1-7)$$

[Step 7]

From the authentication data m stored in the authentication data memory unit 23, the verification key y stored in the verification key memory unit 21, the first signature r stored in the first signature memory unit 24A and further from the second signature s stored in the second signature memory unit 24B, the verification unit 13 in the proof data verification device 10 performs calculation of the foregoing expression (1-1) [r=H (g'y$^s$, m)] to effect verification.

Only when the combination of the access ticket t used in the proof data generation device 11 with the user unique identifying information e is correct, the verification expression is valid and verification is effected correctly.

If the function H of two variables used in this embodiment is made as follows using the hash function h for example, it becomes possible to effect implementation with an access ticket of so-called Schnorr signature in the above configuration:

[Expression 10]

$$H(a,b)=h(b|a) \qquad (1-8)$$

FIG. 5 shows the operation of the implementation using the access ticket of Schnorr signature.

In this case, it suffices for the first signature generation unit 15A in the proof data generation device 11 and the verification unit 13 in the proof data verification device 10 to possess the function of calculating the hash function h.

As to the function H of two variables, for example by transforming the element b in the finite group G into an element {b} in the residue class ring and subsequent addition thereof to a in the residue class ring, that is, by carrying out the following calculation:

[Expression 11]

$$H(a,b)=a+\{b\} \qquad (1-9)$$

it becomes possible to effect implementation using the access ticket of a so-called message recovery type Nyberg- Rueppel signature with a similar configuration. FIG. 6 shows the implementing operation using the access ticket of Nyberg-Rueppel signature.

Although an embodiment of the present invention has been described above, the present invention is not limited thereto, but various modifications may be made. For example, although in the above embodiment the access ticket is fed to the proof data generation device, which in turn generates a signature and sends it to the proof data verification device, a modification may be made such that the access ticket is fed to the proof data verification device, to which device are also fed a portion of a signature or a presignature, as proof data, then the same device generates a signature and makes verification. There may also be adopted a method wherein an integral type user's access rights authentication device is constituted without distinction between the proof data verification device and the proof data generation device, and user unique identifying information and an access ticket are fed to the thus-constituted device to effect authentication. Further, by generating an access ticket from both signature key and user unique identifying information and sending it to the user, a safe distribution of the signature key becomes possible.

According to the present invention, as will be apparent from the above description, unique security characteristic information and user unique identifying information can be made independent of each other and hence it suffices for both protect side and user side to provide only one piece of unique identifying information.

The access ticket is data which is calculated on the basis of both specific user' unique identifying information and unique security characteristic information, and without the knowledge of user unique identifying information it is difficult to calculate a unique security characteristic information from the access ticket. Only when a correct combination of user unique identifying information with an access ticket, namely a combination of user unique identifying information with an access ticket calculated on the basis of the user unique identifying information, is inputted, there is calculated correct proof data. Therefore, the user holds his or her unique identifying information in advance, while the protect side such as a programmer prepares unique security characteristic information independently of the user unique identifying information, then an access ticket is prepared and distributed in accordance with the user unique identifying information and the unique security characteristic information which has been used, for example, in preparing an application program, whereby it is possible to effect the authentication of user unique security such as execution control or the like.

According to the present invention, moreover, it becomes possible to make a safe distribution of a signature key, and a simple key deposit mechanism can be implemented.

What is claimed is:

1. A device for authenticating user's access rights to resources by verifying the legitimacy of a signature generated to prove the right of said user, said device comprising:
   first memory means for storing user unique identifying information e;
   second memory means for storing a customized signature key t calculated from both said user unique identifying information e and a signature key x;
   first generation means for generating a presignature by use of said user unique identifying information e held by said first memory means;
   second generation means for generating a signature by use of said customized signature key t held by said second memory means; and
   verification means for verifying the legitimacy of said signature generated by said second generation means,
   said first generation means and said second generation means are comprised in proof data generation means and are cooperating with each other to generate said signature,
   the proof data generation means being coupled to access ticket generation means; the access ticket generation means generating an access ticket and providing the access ticket to the proof data generation means; and the proof data generation means and the access ticket generation means are within the device.

2. The authentication device according to claim 1, wherein at least said first memory means and said first generation means are protected in protective means which make it difficult to observe interior data and processing procedure from the exterior.

3. The authentication device according to claim 1, wherein at least said first memory means and said first generation means are each constituted as a small-sized, portable computing unit.

4. The authentication device according to claim 1, wherein
   said first generation means comprise third generation means for generating an auxiliary signature key k and a first presignature r', third memory means for storing said auxiliary signature key k, and fourth generation means for generating a second presignature s, and
   said second generation means comprise fifth generation means for generating a first signature r and sixth generation means for generation a second signature s,
   said first signature r being calculated from both authentication data m and said first presignature r',
   said second presignature s' being calculated from said auxiliary signature key k, said first signature r, said user unique identifying information e and a verification key y, and
   said second signature s being calculated from said second presignature s', said first signature r, and said customized signature key t.

5. The authentication device according to claim 4, wherein said signature key x is an element of a residue class ring Z/nZ based on a modulus n in a ring of rational integers, and said verification key y is an element in a finite group G which determines a discrete logarithmic problem and which satisfies the relationship of $y=g^x$ relative to the finite group G and an element g with an order of n.

6. The authentication device according to claim 5, wherein said finite group G is a multiplicative group of a finite field.

7. The authentication device according to claim 5, wherein said verification means judge the signature to be legitimate when the authentication data m and the first and second signatures r, s satisfy a relation equivalent to $r=H(g^r y^s, m)$ relative to a function of two variables H, the base g of the finite group and the verification key y.

8. The authentication device according to claim 7, wherein said function of two variables is the value of a collision-free function which receives a combination of data determined from the element in the finite group with authentication data.

9. The authentication device according to claim 7, wherein said function of two variables is a value obtained by the addition of the element in the residue class ring Z/nZ based on the modulus n in the ring of rational integers which is determined from the element of the finite group and the authentication data.

10. The authentication device according to claim 1, wherein said customized signature key held by said second memory means is determined by said signature key, said verification key, said user unique identifying information and a collision-free function in such a manner as to satisfy $$t \equiv x - f(e,y) \pmod{N}$$

where N is an arbitrary multiple of n.

11. The authentication device according to claim 1, wherein said first generation means and said verification means can execute the algorithm of a finite group G.

12. The authentication device according to claim 1, wherein said second generation means and said verification means can calculate a function of two variables.

13. The authentication device according to claim 4, wherein said third generation means a random number k as the auxiliary signature key, stores it in the third memory means, multiplies the base g in group G by k using the auxiliary signature key k and calculates the first presignature $r'=g^k$, said fifth generation means receives both said authentication data m and said first presignature r' and calculates said first signature r=H(m, r') using said function of two variables, said fourth generation means multiplies said first signature r by a collision-free function value of the user unique identifying information e and the verification key y and then subtracts the resulting product from said auxiliary signature key to calculate said second presignature s'=k−rf (e,y), and said sixth generation means multiplies said first signature r by said unique signature key t and subtracts the resulting product from said second presignature s' to calculate said second signature s=s'−rt.

14. The authentication device according to claim 1, wherein said verification means is provided with random number generation means, and said random number generation means generate a random number and store it as authentication data in fourth memory means.

15. The authentication device according to claim 14, wherein said verification means verify signature for the authentication data which is said random number.

16. The authentication device according to claim 14, wherein said authentication data is an output G (m') when the random number m' generated by said random number generation means is an input to a collision-free function G.

17. The authentication device according to claim 1, wherein the first and second generation means comprise a proof data generation device and the verification means comprises a proof data verification device, said proof data generation device including at least said first memory means, said second memory means, said first generation means and said second generation means, and said proof data verification device including at least said proof data verification means, fourth memory means for storing authentication data, and fifth memory means for storing proof data, said proof data generation device and said proof data verification device communicating with each other to authenticate a right of the user, wherein said proof data verification device stores the authentication data stored in said fourth memory means into sixth memory means of said proof data generation device, said proof data generation device stores a signature into said fifth memory means in said proof data verification device, said signature having been generated by said second generation means on the basis of said authentication data stored in said sixth memory means, and said proof data verification device authenticates a right of the user by use of said signature stored in said fifth memory means.

18. A method for authenticating user's access rights to resources by verifying the legitimacy of a signature generated to prove the right of said user, said method comprises:

a first memory step of storing user unique identifying information e;

a second memory step of storing a customized signature key t calculated from both said user unique identifying information e and a signature key x;

a proof data generation step that comprises a first generation step and a second generation step;

the first generation step of generating a presignature by use of said user unique identifying information e held in said first memory step;

the second generation step of generating a signature by use of said customized signature key t held in said second memory step;

the proof data generation step using a proof data generation device that is coupled to an access ticket generation device, the access ticket generation device generating an access ticket and providing the access ticket to the proof data generation device, wherein the proof data generation device and the access ticket generation device are within the same device; and a verification step of verifying the legitimacy of said signature generated in said second generation step, said first and second generation steps cooperating with each other to generate said signature.

19. A signature device comprising:

first memory means for storing user unique identifying information e;

second memory means for storing a customized signature key t calculated from both said user unique identifying information e and a signature key x;

first generation means for generating a presignature by use of said user unique identifying information e held in said first memory means; and second generation means for generating a signature by use of said customized signature key t held in said second memory means, said first and second generation means are comprised in proof data generation means and are cooperating with each other to generate said signature, the proof data generation means being coupled to access ticket generation means, the access ticket generation means generating an access ticket and providing the access ticket to the proof data generation means;

and the proof data generation means and the access ticket generation means are within the signature device.

20. The authentication device of claim 3, wherein the portable computing unit comprises an IC card.

* * * * *